Sept. 21, 1948.　　　D. R. BALLARD　　　2,449,544
SPARE TIRE CARRIER ATTACHMENT FOR TRUCKS
Filed Aug. 26, 1946
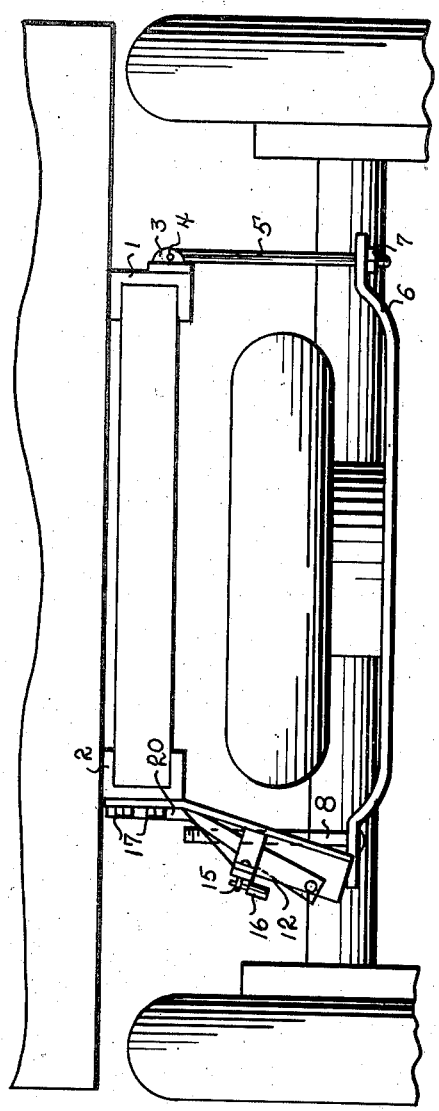
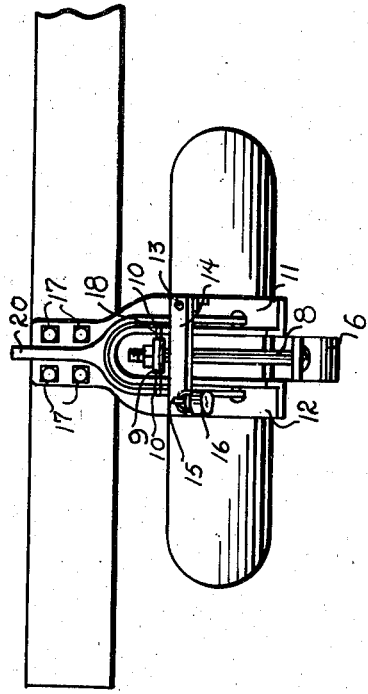
*INVENTOR.*
DANA R. BALLARD
ATTORNEYS Patented Sept. 21, 1948

2,449,544

UNITED STATES PATENT OFFICE 2,449,544

SPARE TIRE CARRIER ATTACHMENT FOR TRUCKS

Dana R. Ballard, Madera, Calif.

Application August 26, 1946, Serial No. 693,043

1 Claim. (Cl. 224—29)

This invention relates to improvements in devices for carrying spare tires.

Devices for carrying spare tires as generally provided on trucks usually require an appreciable amount of time to disassemble and release a spare tire. Under present traffic conditions, in certain situations such as on bridges, in tunnnels, etc., it is necessary that tires be changed as rapidly as possible.

It is, therefore, an object of this invention to provide a tire carrier which can be quickly opened with a single operation to release a tire.

A further object is the provision of a tire carrier attachment which can be conveniently attached to the chassis of most trucks.

These and other objects are attained by the novel construction and arrangement of parts hereinafter described and illustrated in the accompanying drawings, forming a part hereof, and in which:

Figure 1 is an elevational view of a tire carrier embodying the invention;

Figure 2 is an end view of the tire carrier;

Figure 3 is an elevational view of the device in an open condition.

Referring to the drawings, the tire carrier is shown to include a pair of channels 1 and 2 adapted to be bolted or otherwise secured to the frame of a truck. Attached to channel 1 is an ear 3 which has pivotally connected thereto at 4 a bolt 5, the lower end of which passes through an aperture in a cross bar 6, and the lower end of the bolt 5 has threaded thereon a nut 7.

The other end of cross bar 6 has passing through an aperture therein a bolt 8 which passes through a plate 9, which is attached to a pair of arms 10 by means of a bolt 18 and the lower ends of the arms are pivotally supported by substantially arcuate shaped angle irons 11 and 12, and notches 19 in the irons 11 and 12 receive the bolt 18 when the carrier is in position as shown in Figures 1 and 2.

A pin 13 is attached to angle 11 and has pivoted thereto an arm 14, which is provided with an aperture to receive an eye bolt 15 attached to angle 12. The eye bolt 15 or similar means is adapted to receive a padlock 16 to prevent theft of a tire carried by the device.

As shown in Figure 2, the angles 11 and 12 are preferably integral at their attachment with the channel 2 by means of bolts 17.

In operation, to open the device, the lock 16 is removed, and arms 10 pulled down to the position shown in Figure 3, by means of the handle grip 20 formed at the upper medial portion thereof. From the above description, it will be seen that there has been provided a simple tire carrier which can be quickly opened by a single operation to enable a tire to be removed.

The above description is to be considered illustrative and not limitative of the invention, of which modifications can be made without departing from the spirit and scope of the invention as set forth in the appended claim.

The invention having been described, what is claimed is:

In a tire carrier, a first channel and a second channel for attaching the carrier to truck frame, a bolt pivotally connected to the first channel, a bar having an aperture through which the bolt passes, the bar having a second aperture, a second bolt passing through the second aperture, a plate having an aperture through which the second bolt passes, arms attached to the plate, angle irons pivotally supporting the arms, and means supported by the angle irons to lock the arms in a raised position.

DANA R. BALLARD.

REFERENCES CITED

The following references are of record in the file of this patent:

UNITED STATES PATENTS

| Number | Name | Date |
| --- | --- | --- |
| 1,730,121 | Buerger | Oct. 1, 1929 |
| 1,761,916 | Hebner | June 3, 1930 |
| 1,913,835 | Golike | June 13, 1933 |
| 2,153,803 | Jerabek | Apr. 11, 1939 |

FOREIGN PATENTS

| Number | Country | Date |
| --- | --- | --- |
| 88,305 | Switzerland | Feb. 16, 1921 |